(12) United States Patent
Wang

(10) Patent No.: US 8,099,583 B2
(45) Date of Patent: Jan. 17, 2012

(54) METHOD OF AND APPARATUS AND ARCHITECTURE FOR REAL TIME SIGNAL PROCESSING BY SWITCH-CONTROLLED PROGRAMMABLE PROCESSOR CONFIGURING AND FLEXIBLE PIPELINE AND PARALLEL PROCESSING

(75) Inventor: Xiaolin Wang, Concord, MA (US)

(73) Assignee: Axis Semiconductor, Inc., Boxborough, MA (US)

( * ) Notice: Subject to any disclaimer, the term of this patent is extended or adjusted under 35 U.S.C. 154(b) by 510 days.

(21) Appl. No.: 11/973,184

(22) Filed: Oct. 6, 2007

(65) Prior Publication Data

US 2008/0301413 A1   Dec. 4, 2008

(51) Int. Cl.
*G06F 15/80* (2006.01)
*G06F 9/30* (2006.01)

(52) U.S. Cl. .............. 712/219; 712/11; 712/15; 712/220

(58) Field of Classification Search .................... 712/11, 712/15, 219, 220
See application file for complete search history.

(56) References Cited

U.S. PATENT DOCUMENTS

| | | | |
|---|---|---|---|
| 5,212,777 A | 5/1993 | Gove et al. | |
| 5,226,125 A | 7/1993 | Balmer et al. | |
| 5,239,654 A | 8/1993 | Ing-Simmons et al. | |
| 5,471,592 A | 11/1995 | Gove et al. | |
| 5,471,626 A * | 11/1995 | Carnevale et al. | 712/219 |
| 5,706,459 A * | 1/1998 | Atsushi | 712/200 |
| 5,784,636 A | 7/1998 | Rupp | |
| 5,887,160 A * | 3/1999 | Lauritzen et al. | 712/222 |
| 5,937,203 A | 8/1999 | Lee | |
| 6,023,753 A | 2/2000 | Pechanek et al. | |
| 6,052,773 A | 4/2000 | DeHon | |
| 6,070,003 A | 5/2000 | Gove et al. | |
| 6,151,668 A | 11/2000 | Pechanek et al. | |
| 6,173,389 B1 | 1/2001 | Pechanek et al. | |
| 6,216,223 B1 | 4/2001 | Revilla et al. | |
| 6,219,785 B1 | 4/2001 | Smith | |
| 6,321,322 B1 | 11/2001 | Pechanek et al. | |
| 6,446,191 B1 | 9/2002 | Pechanek et al. | |

(Continued)

FOREIGN PATENT DOCUMENTS
EP   0284364 A   9/1988
(Continued)

OTHER PUBLICATIONS

Michael Taylor et al., The Raw Processor: A Composeable 32-Bit Fabric for Embedded and General Purpose Computing, MIT Laboratory for Computer Science, Proceedings of Hotchips 13, Aug. 2001, 4 pages.

(Continued)

*Primary Examiner* — Aimee Li
(74) *Attorney, Agent, or Firm* — Vern Maine & Associates

(57) ABSTRACT

A new signal processor technique and apparatus combining microprocessor technology with switch fabric telecommunication technology to achieve a programmable processor architecture wherein the processor and the connections among its functional blocks are configured by software for each specific application by communication through a switch fabric in a dynamic, parallel and flexible fashion to achieve a reconfigurable pipeline, wherein the length of the pipeline stages and the order of the stages varies from time to time and from application to application, admirably handling the explosion of varieties of diverse signal processing needs in single devices such as handsets, set-top boxes and the like with unprecedented performance, cost and power savings, and with full application flexibility.

30 Claims, 10 Drawing Sheets

U.S. PATENT DOCUMENTS

| | | | |
|---|---|---|---|
| 6,467,036 B1 | 10/2002 | Pechanek et al. | |
| 6,539,438 B1 | 3/2003 | Ledzius et al. | |
| 6,574,764 B2* | 6/2003 | Krech et al. | 714/738 |
| 6,704,857 B2 | 3/2004 | Barry et al. | |
| 6,851,041 B2 | 2/2005 | Pechanek et al. | |
| 6,859,873 B2* | 2/2005 | Norden et al. | 712/220 |
| 6,883,088 B1 | 4/2005 | Barry et al. | |
| 6,954,281 B2 | 10/2005 | Fukuda et al. | |
| 7,036,036 B2 | 4/2006 | Vorbach et al. | |
| 7,200,287 B2 | 4/2007 | Fukuda et al. | |
| 7,260,707 B2* | 8/2007 | Norden et al. | 712/219 |
| 7,395,411 B2* | 7/2008 | Kasahara | 712/200 |
| 7,406,588 B2* | 7/2008 | Lin et al. | 712/219 |
| 7,454,598 B2* | 11/2008 | Hastie | 712/216 |
| RE41,703 E | 9/2010 | Pechanek et al. | |
| 2001/0012127 A1 | 8/2001 | Fukuda et al. | |
| 2001/0021278 A1 | 9/2001 | Fukuda et al. | |
| 2002/0162046 A1* | 10/2002 | Krech et al. | 714/5 |
| 2002/0199085 A1* | 12/2002 | Norden et al. | 712/219 |
| 2003/0061473 A1 | 3/2003 | Revilla et al. | |
| 2003/0079109 A1 | 4/2003 | Pechanek et al. | |
| 2003/0088757 A1 | 5/2003 | Lindner | |
| 2003/0200420 A1 | 10/2003 | Pechanek et al. | |
| 2004/0019765 A1* | 1/2004 | Klein, Jr. | 712/15 |
| 2004/0078548 A1* | 4/2004 | Claydon et al. | 712/1 |
| 2005/0021578 A1 | 1/2005 | Chen | |
| 2005/0076187 A1* | 4/2005 | Claydon | 712/11 |
| 2005/0149699 A1* | 7/2005 | Norden et al. | 712/219 |
| 2006/0028683 A1 | 2/2006 | Fukuda et al. | |
| 2006/0253689 A1 | 11/2006 | Knowles | |
| 2006/0259741 A1* | 11/2006 | Hastie | 712/215 |
| 2006/0259742 A1* | 11/2006 | Norden et al. | 712/219 |
| 2006/0259748 A1* | 11/2006 | Lin et al. | 712/226 |
| 2007/0143577 A1 | 6/2007 | Smith | |

FOREIGN PATENT DOCUMENTS

| | | |
|---|---|---|
| EP | 569312 A2 * | 11/1993 |
| EP | 1199629 A1 * | 4/2002 |
| EP | 1780644 A1 | 5/2007 |
| WO | 9744728 | 11/1997 |
| WO | 2003088071 A2 | 10/2003 |

OTHER PUBLICATIONS

PCT Search Report for PCT Application No. PCT/IB2008-001867, Dec. 30, 2008.

Barat F et al, Reconfigurable instructin set processors from a hardware/software perspective, IEEE Transactions on Software Engineering, IEE Service Center, vol. 28, No. 9, Sep. 1, 2002, 16 pp.

Chen D C et al, A Reconfigurable Multiprocessor IC for Rapid Prototyping of Algorithmic-Specfiic High-Sped DSP Data Paths, IEEE Journal of Soldid-State Circuits, IEE Service Center, vol. 27, No. 12, Dec. 1, 1992, 10 pages.

Hans M Jacobson et al, Application-Specific Programmable Control for High-Performance Asynchronous Circuits, Proceedings of the IEEE, IEEE. NY, NY vol. 87, No. 2, Feb. 1, 1999, 13 pages.

PCT Search Report dated Aug. 25, 2010 of Patent Application No. PCT/IB2009/000135 filed Jan. 26, 2009.

Anirban Baso: "A Transputer Based Adaptable Pipeline" Internationl Conference on Supercomputing, Conferenceproceedings. ACM, New York, US vol. 1, May 4, 1987.

Schmit H H et al: "Pipeline Reconfigurable FPGAS" Journal of VLSI Signal Processing Systems for Signal, Image, and Video Technology, Springer, New York, NY US LNKD-DOI: 10.1023/A: 1008137204598, vol. 24, No. 2/03, Mar. 1, 2000, pp. 12-145, XP000908461 ISSN:0922-5773 the whole document.

Michael Taylor et al., The Raw Processor: A Composeable 32-Bit Fabric for Embedded and General Purpose Computing, MIT Laboratory for Computer Science, Proceedings of Hotchips 13, Aug. 2001.

USPTO Non-Final Office Action for U.S. Appl. No. 12/156,007, dated Mar. 28, 2011, 20 pages.

USPTO Non-Final Office Action for U.S. Appl. No. 12/156,006, dated Nov. 17, 2010, 6 pages.

USPTO Final Office Action for U.S. Appl. No. 12/156,006, dated Feb. 17, 2011, 7 pages.

* cited by examiner

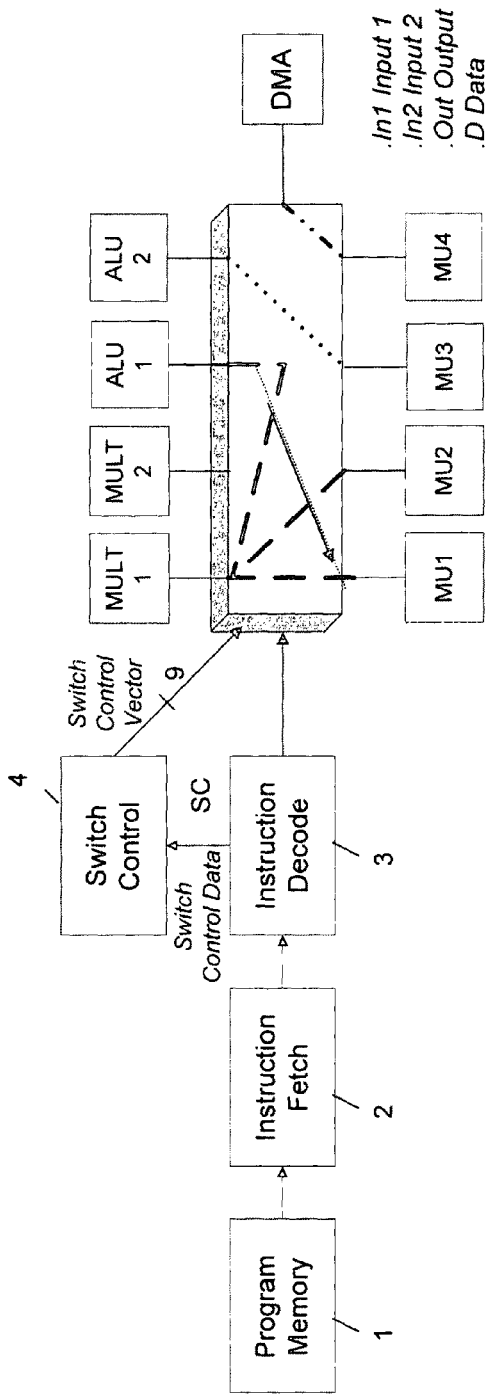

FIG. 9

| Assembly Instruction | MULT1 | MULT2 | ALU1 | ALU2 | MU1 | MU2 | MU3 | MU4 | DMA | Switch Matrix | CC |
|---|---|---|---|---|---|---|---|---|---|---|---|
| A Vector Multiply: MU1(1) <- MU1(1:8) x MU2(1:8) | A | A | A |  | A | A |  |  |  | SW(A) | 1 |
| B Move: MU4(1:8) <- DMA(1:8) | A | A | A |  | A | A |  | B | B | SW(B) | 2 |
| C Vector Sum: MU3 <- MU3(1..8) | A | A | A | C | A | A | C | B | B | SW(C) | 3 |
|  | A | A | A | C | A | A | C | B | B |  | 4 |
| ........ | A | A | A | C | A | A | C | B | B |  | l |
| D Vector Multiply: MU1(2) <- MU1(9:16) x MU2(9:16) ↗ *Delayed issue due to resource unavailability* | D | D | D | C | D | D | C | B | B | SW(D) | m |
| ........ | D | D | D | C | D | D | C | B | B |  |  |
| ........ | D | D | D | C | D | D |  | B | B |  |  |
| ........ | D | D | D | C | D | D |  | B | B |  | n |
| ........ | D | D |  |  | D | D |  |  |  |  |  |
| ........ | D | D |  |  | D | D |  |  |  |  | 2l |

Note: PD(A&D) = l CC, PD(B) = (m−2) CC, PD(C) = (n−3) CC    PD – Propagation Delay    CC – Clock Cycle

METHOD OF AND APPARATUS AND ARCHITECTURE FOR REAL TIME SIGNAL PROCESSING BY SWITCH-CONTROLLED PROGRAMMABLE PROCESSOR CONFIGURING AND FLEXIBLE PIPELINE AND PARALLEL PROCESSING

FIELD

The invention of the present application relates generally to the field of real-time signal processing, being more particularly concerned with the problems of increasing signal processing demand being driven by the convergence of more and more varieties of different data communication features desired to be present in a single device—such as a handset or set-top boxes or a single device package or the like.

BACKGROUND OF INVENTION

Present-day processors for digital signal processing (DSP) software algorithm computations in handsets, set-top boxes and other single device packages are struggling with the problem of accommodating the convergence of a wide variety of different real-time signal processing needs and control processing capabilities required to be handled in a single device. Such convergence of more and more features in a single device compounded with ever-evolving technology standards has led to exponentially increasing signal processing demand, creating new technology challenges. This is particularly true for mobile devices and for home network standards and different services, among other applications.

Existing technology choices for current System On Chip (SoC) design in emerging markets include the above mentioned DSP, General Purpose Processor (GPP) and Application Specific Integrated Circuit (ASIC) Block. Unfortunately, however, each of these falls short of fully solving the problem. While DSP is programmable for different applications and provides good real-time performance for DSP-centric algorithms, such as voice and data communications, DSP has limited control and general purpose processing capability. With GPP, again different applications are programmable, but with poor real-time performance and with the requirement for quite extensive control processing capability. As for the ASIC Block approach, while this may be optimized for specific application algorithms in terms of processing performance, this technique has very limited programmability and is usually not reusable for new applications, technologies and standards. To try to combine these three technological approaches, moreover, provides a trade-off near-impossibility (e.g. Qualcomm 3GMM Baseband—attempting to combine in a single SoC to meet the requirement with 2 DSPs+2 GPP's+13 ASIC accelerator blocks, for example). Such an approach, moreover, requires dedicated hardware for many possible features which hardware is not simultaneously exercised in such usage mode and still always takes up die area and consumes power.

The problems with current technologies as "solutions" reside in the fact that the systems become ever more complex, inflexible and costly, requiring more specialized cores that result in highly complex systems, with component and system scalability becoming an ever-pressing issue. New features, applications and standards, moreover, become harder to incorporate. More complex systems additionally mean longer development cycles and higher cost/performance ratios.

The present invention, indeed, as later fully explained, addresses the solution by providing a novel programmable core that can meet all the processing needs of the current device applications, which current processor architectures cannot accomplish, though the art is struggling with improvement proposals.

The advent of the pipeline processor, however, did significantly increase execution speed from CISC (Complicate Instruction Set Computer) to RISC (Reduced Instruction Set Computer). For an example of five instructions, CISC required 31 cycles to execute them in series; whereas the pipelined RISC provided a 350% improvement in throughput. Current deep-pipelined multi-issue DSP architecture followed with hardware added for pipelined implementation and functional units were created to increase parallelism of data flow with faster buses and increased clock rates. This has resulted, however, in increased complexity, larger die size and higher power consumption. But more importantly, as the emerging applications require more diverse signal processing algorithms, many are beyond that accommodated by conventional DSP technology—voice, audio, video image processing, data communication, etc. While the pipelined architecture improves the performance of a CPU, the pipeline solution loses its advantage when the order of calculations is different from the functional blocks aligned in a pipeline. In that case, calculation takes much longer. The pipeline solution is not always very efficient in operation, either. For instance, load and store instructions never use the stage for mathematical calculation. A specific pipeline, moreover, just cannot serve the needs of all algorithms—the exploding variety of real-time signal processing now desired in mobile and consumer devices, with current DSP and GPP techniques unable adequately to meet such emerging signal processing needs.

The present invention is believed to have provided a breakthrough solution through a programmable core and reconfigurable pipeline that admirably meets the processing needs of today's diverse applications through a novel combining of microprocessor-based technology developed for optimizing control programs based on fixed pipeline architectures, and switch fabric technology for the different field of telecommunication equipment, including internet routers/switches and embedded processors. The invention, indeed, combines the strengths of both CISC and RISC architectures, but surpasses the performance of current high-performance DSP cores, providing the programmability and flexibility of a general purpose processor and an architecture well-suited to a wide variety of processing needs, including communications algorithms, multimedia processing (audio, video, imaging), networking protocols, control functions and the like—in short, an application "agnostic" architecture for a "converged" world.

OBJECTS OF INVENTION

A primary object of the invention, accordingly, is to provide a new and improved method of and architecture apparatus or system for processing software computational instructions of a wide variety of different real-time signal processing applications, including for convergence in single devices, that shall not be subject to any of the above-described limitations and/or disadvantages of prior art approaches but that, to the contrary, provides for meeting the processing needs of today's devices and expanding applications.

A further object is to provide such an improvement through a novel combination of microprocessor-based technology, and switch fabric technology from the different field of switching telecommunications in which applicant has been consulting and inventing for several decades.

Still another object is to provide a novel combination of a programmable embedded processor with reconfigurable pipeline stages wherein the configuring of the processor functional components permits of a flexible and specific application-tailored pipeline as distinguished from prior fixed single pipeline data streams.

Another object is to provide such flexibility through a cross-connect switch fabric in a dynamic, parallel and flexible fashion wherein the switch is configured through each application set of instructions during operation and in real-time.

Still another object is to provide such a novel technique wherein, after application software instruction decoding, the length of the pipeline stages and the order of the stages varies from time to time and from application to application.

An additional object is to provide such a new programmable embedded processor and reconfigurable pipeline wherein the architecture is scalable and wherein the processor is configured for performing parallel processing utilizing fully the calculation capability of the internal processor functional components.

Another objective is to allow software programmers to created new user-defined assembly instructions which correspond to specific internal processor configurations that are tailored to the new-defined function.

Other and further objects will be pointed out hereinafter and are more fully delineated in the appended claims.

SUMMARY

In summary, however, from its novel methodology aspect, the invention embraces a method of processing computer software computational instructions fed to a processor, that comprises, compiling and analyzing inputted user software applications to determine the specific computational tasks that need to be performed for each software application; generating a set of instructions in real time for each application configuration of the processor and the connections among its functional components required for that specific application; connecting the processor through switching to a data pipeline of variably configurable length and order of its stages; and communicating the processor components configured for each specific application through the switching in a dynamic, parallel and flexible fashion, correspondingly to configure the appropriate length and order of the pipeline stages for each specific application.

For apparatus implementation for the practice of the invention, it contemplates a flexible data pipeline architecture for accommodating substantially all types of software computational instruction sets for varying applications having, in combination, a programmable processor with reconfigurable pipeline stages the order and lengths of which vary in response to varying application instruction sets that establish corresponding configurations of the processor and of the connections, amongst its functional components specifically to suit the application.

The novel processor architecture of the invention enables greater scalability and flexibility than the prior DSP and GPP techniques previously mentioned and, importantly, is application agnostic and requires shorter application development cycles, and lower cost/performance rates.

Preferred and best mode embodiments are hereinafter described in detail.

DRAWINGS

The invention will now be described with reference to the accompanying drawings, FIG. 1 of which is a pie-type diagram published by Nokia in 2005 and illustrating the before-discussed wide variety of real-time signal processing application requirements, as well as good control processing capabilities required in a single device for use with the Internet—digital content, services, software and devices for illustrative "media, telecom, consumer electronics, information technology and entertainment" applications;

FIG. 8 is a similar diagram illustrating the flexible pipeline and parallel processing of the system of FIG. 4 for the exemplary parallel processing of three assembly instructions;

FIG. 9 is a chart illustrating the core compiler operation (FIG. 5) of the invention.

DESCRIPTION OF PREFERRED EMBODIMENT(S)

Figure 1:
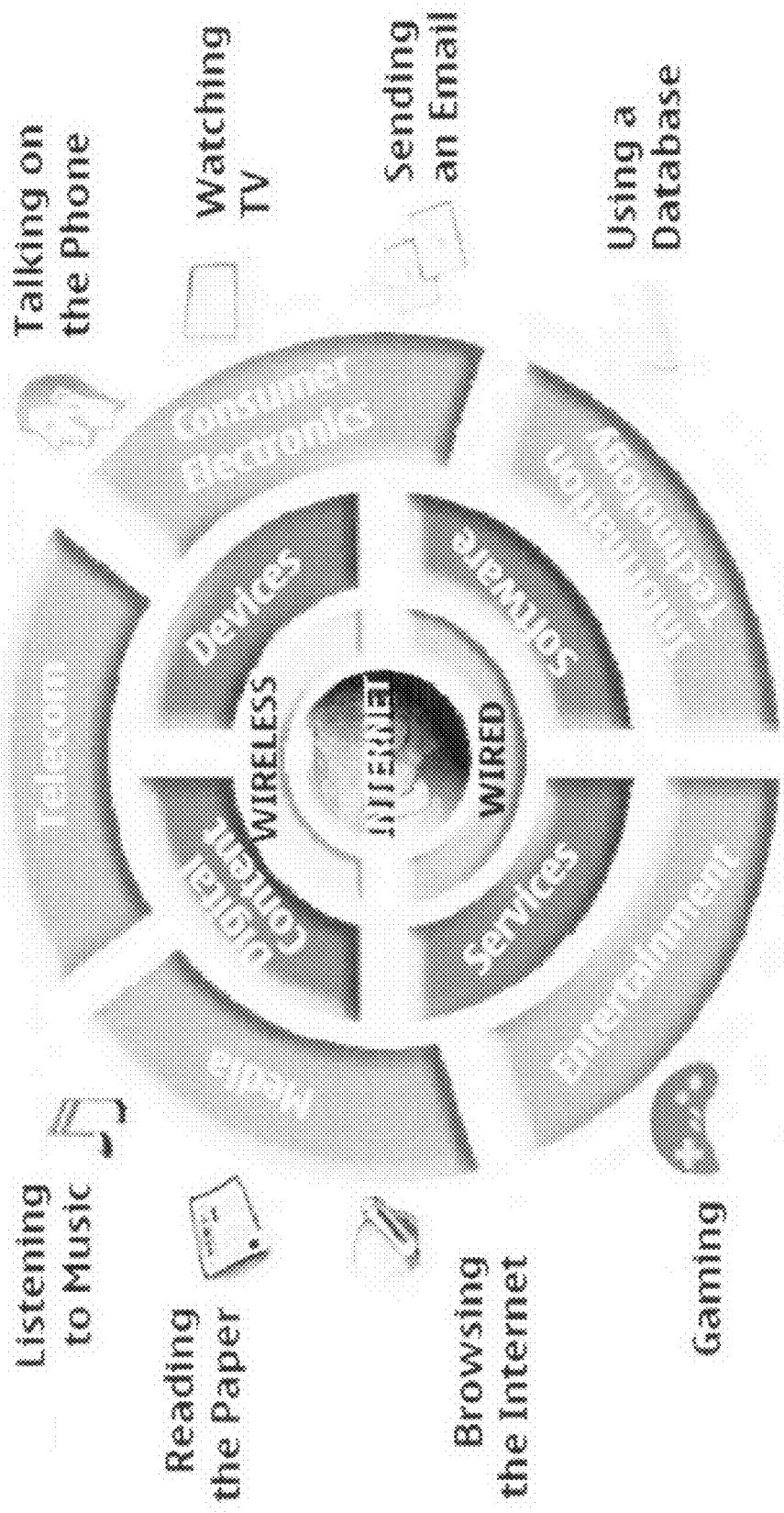
Figure 2:
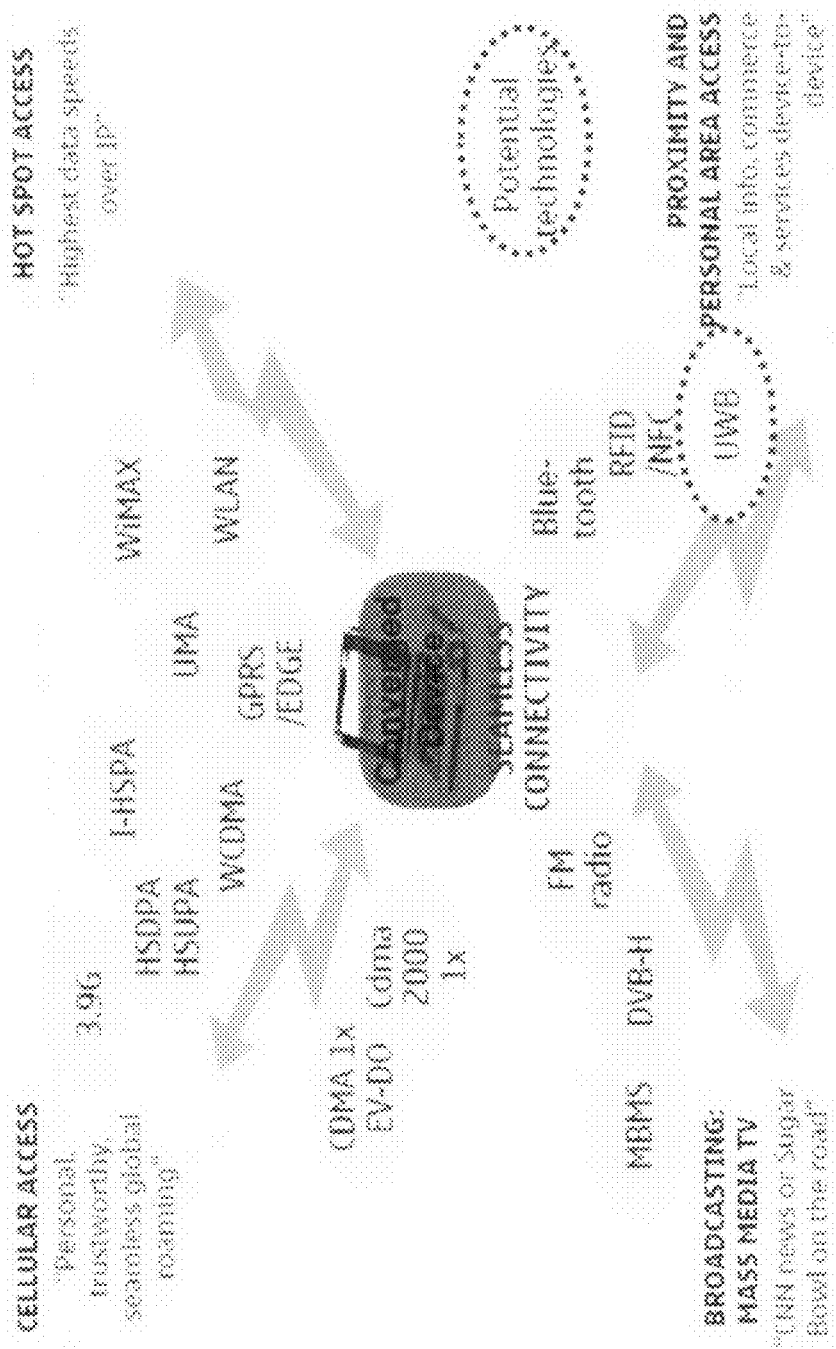
FIG. 2 is a similar Nokia self-explanatory diagram showing the convergence of many features in a single device ("converged device") compounded with ever-increasing technology standards pushing the increased signal processing demand ("cellular access", "hotspot access", "proximity and personal area access" and "broadcasting mass media TV" as illustrations)
Figure 3:
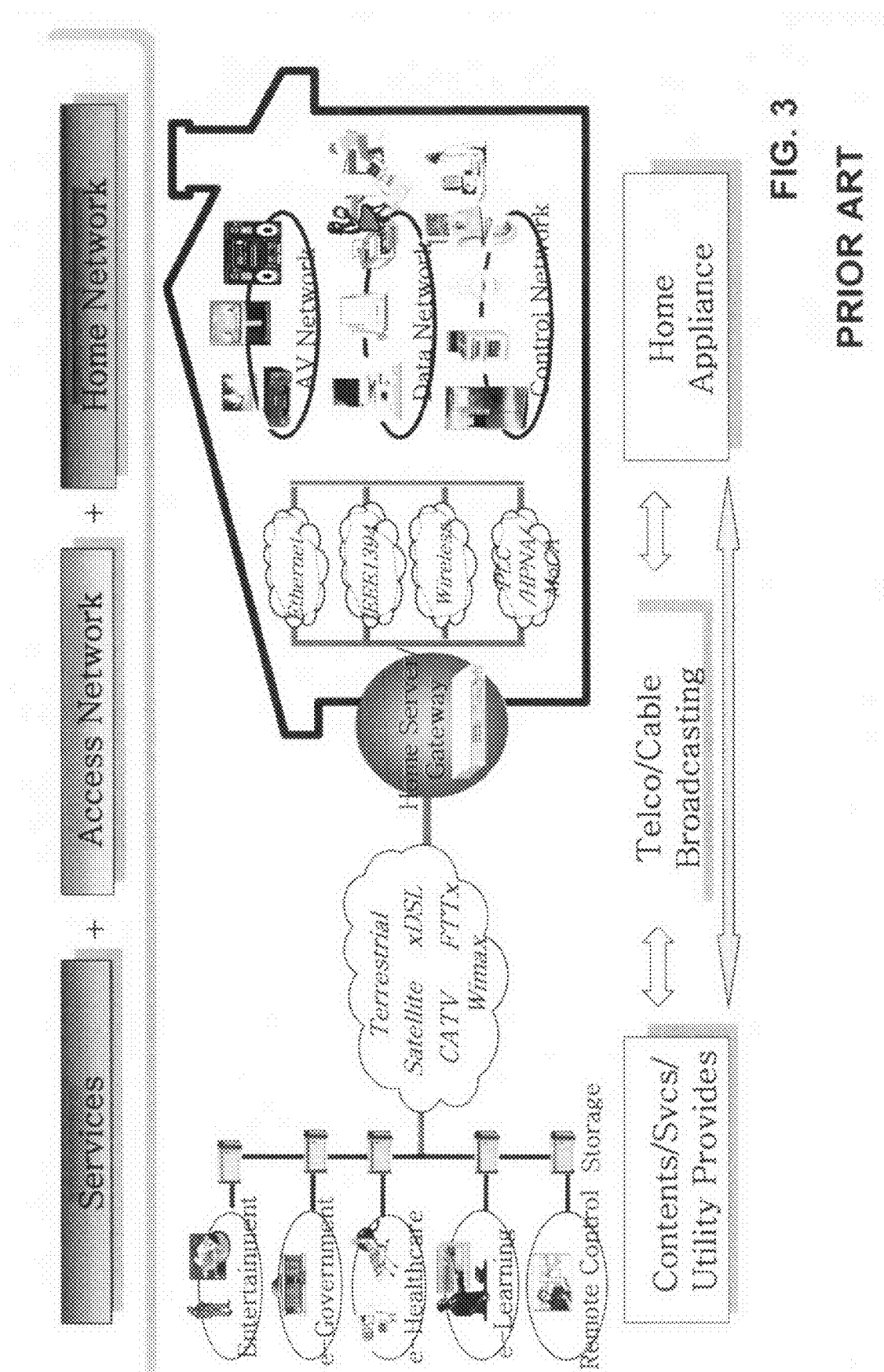
FIG. 3 is a similar converged home network system diagram involving utility service providing, telco/cable broadcasting, and home appliance applications, again demonstrating the need to accommodate vastly different technologies, different home network standards and different services in the network—all leading to the increasing signal processing demand.
Figure 4:
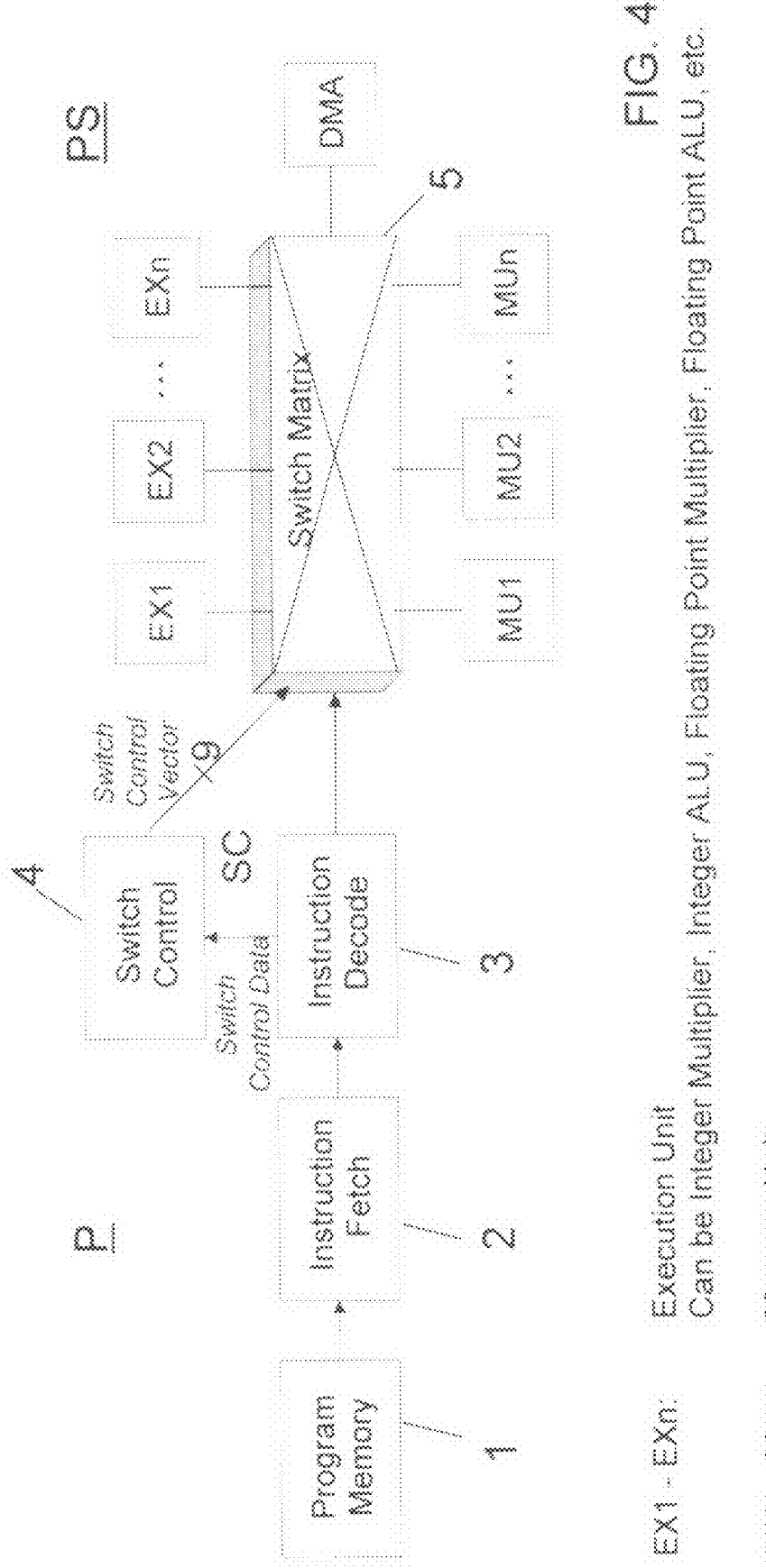
FIG. 4 is a combined block and schematic circuit diagram of a preferred embodiment of the programmable core processor-reconfigurable pipeline system and method of the invention in simplified form.

Turning first to the basic and generic pipeline structure and methodology diagram of this invention shown in FIG. 4, the flexible data pipeline architecture for the programmable processor is generally represented at P, with the reconfigurable pipeline stages represented at PS. Software application instructions stored in program memory 1 may be fetched at 2 and decoded at 3 for controlling the switch control 4 of a cross-connect switch matrix 5.

While the processor P of the invention may have the same type of functional components as those used in current RISC processors, shown as mathematical execution units EX1-EXn (multipliers, adders, shifters or a pipelined multiplier, for example) and memory units such as data memory banks at MU1-MUn, these components in the programmable processor of the invention communicate with one another in a fundamentally different manner from the RISC processor. In today's fixed staged pipeline RISC processors, instructions are executed in fixed order. As a result, functional units in such a processor are not efficiently utilized and they become increasingly more complex and costly.

Instead of lining the similar functional units up into a pipeline, the invention uses the switch matrix 5 to provide the flexibility of connecting them to adapt or configure them for the specific tasks required of the particular software application instruction set. The cross-connect switch 5, moreover, connects execution units EX1-EXn on one side and memory blocks MU1-MUn on the other side, configuring them into different structures in accordance with the different software algorithms of the different applications, and at different times.

Figure 5:
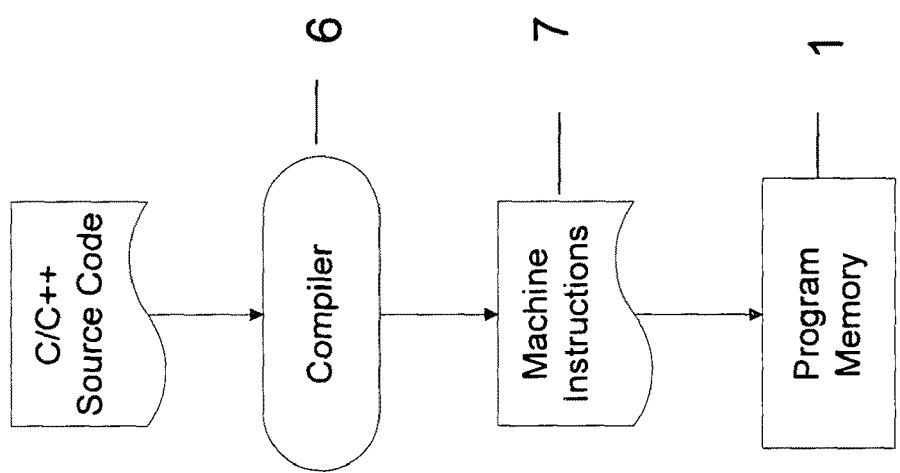
FIG. 5 is a flow diagram illustrating the steps in the programming of the core processor of FIG. 4.

The programming of the program memory 1 is shown in FIG. 5 wherein a compiler 6 converts source code program C/C++ to machine code instructions 7 and feeds such to the program memory 1. These include traditional instructions for setting the execution units into the operational mode, special switch control instructions SC to enable connections between different hardware execution units, and special memory unit configuration instructions MU for setting the parameters for the memory unit operations. The compiler 6 exploits parallelism for any specific given program based on a specific instruction sequence and hardware availability. The compiler then produces machine instructions in the appropriate time sequence that configure the hardware units EX. MU and DMA (Direct Memory Access) and the connections between them, as outlined in chart of FIG. 9.

While in the RISC type operation, the instructions are executed with fixed pipeline stages all within the same fixed clock cycles, as before noted, the cross-connect switch 5 of the invention connects execution units EX and memory blocks MU configuring them, as before noted, into different structures for different algorithms at different times. The connections of the cross-connect switch 5 are determined during program compilation time. The compiler analyzes each task in a program. Based on the resources that are available at the time, it decides to configure the available resources for the current task or to hold off the instruction execution. Execution units EX in the diagram and memory banks are routed into a network allowing execution of multiple tasks in parallel. Or it configures all resources into one large pipeline. The functionality of each execution unit EX, however, may take multiple cycles to achieve. Each EX may have unique functionality and can be configured for rather complicated functions. Those are very difficult to be realized by fixed pipeline solutions. All this data from one EX to another is through the switch, instead of a prior art bus, then to the memory or somewhere else. It greatly reduces the bus bandwidth required.

As before explained, the symbol EX is a mathematical unit—a multiplier, an adder, a shifter, or a pipeline multiplier, etc. A multiplier can be constructed, for example, by many adders. For instance, a 16×16 multiplier can be constructed by 16 adders. Furthermore, those adders can be pipelined. That means one multiplier can be finished after a certain number of cycles. For example, A+B+C+D usually has to be executed in four cycles. If adders are used as part of a multiplier, four additions may be executed in one cycle. EX can thus be very flexible and constructed by operational code at runtime. The multiple memory banks MU connected to the switch 5 provide data for the parallel processing. Each EX may require its own data unlike general-purpose CPU design, which has only one memory and only one piece of data that may be fetched for each cycle. The EX unit, moreover, can be configured for an equation. With the approach of the invention, multiple EXs, not just one, can be handled as in a general-purpose processor or a DSP. This provides efficiency in solving more complicated problems.

The architecture of the invention may process multiple data at the same time and write them back as well, making it possible more efficiently to fully utilize the hardware inside a device, unlike conventional general-purpose processors and DSPs which can only use one resource at any time and leave the rest idle. The configurability during compile time not only minimizes the complexity of logic design but can also support more applications.

To address the need for ever-increasing computational power, today's pipeline DSP and general-purpose processor designs take two commonly used approaches—to increase clock rate and to integrate more and more accelerators. What is needed, however, is not a faster instruction decoder or faster instruction fetch. When more computing power is needed, the invention simply uses more execution units during the design phase and keeps the rest of the processor design unchanged. There will be very limited die increase. Consequently, there will be less power consumption and smaller die size compared to the current staged fixed pipeline approach. The architecture of the invention covers both general-purpose processor and DSP.

Figure 7:
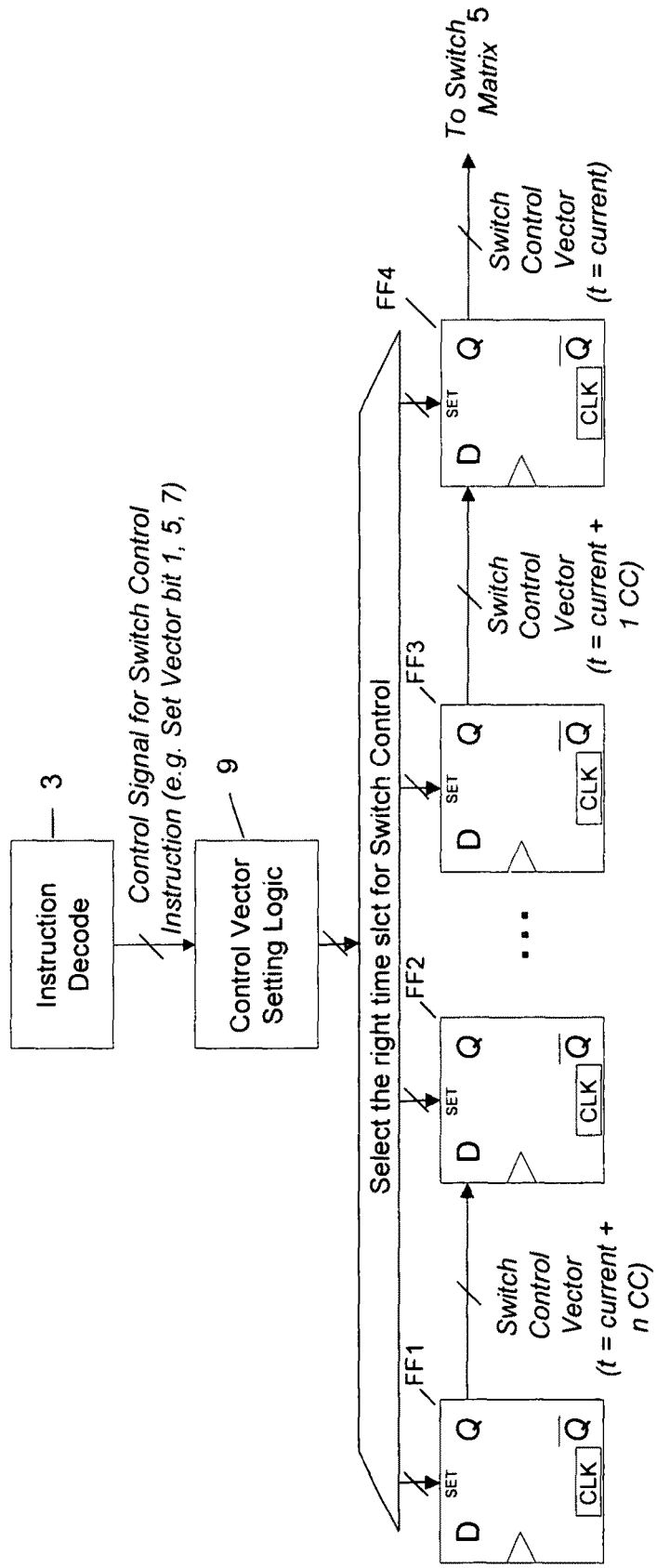
FIG. 7 is a block and schematic circuit diagram of the detailed switch control instruction and control unit of FIG. 4.

Returning to FIG. 4, the application instruction decoded at 3 provides switch control data SC for the switch control 4 of the switch matrix 5 and which, in turn, provides a switch control vector schematically illustrated at 9 for effecting the switching logic. That control provides the switch vectors, as labeled, for setting the connections for each application from the output of one EX unit to the input of another; from any MU unit to an EX input; from the DMA (Direct Memory Access) to any MU; and from the instruction decoder 3 to any EX, MU or DMA. This is more detailed in FIG. 7 wherein four flip-flops FF1-FF4 are all set to default the switch control vector value after power up. The control signal for the switch control instruction will set the appropriate vector bit (1, 5, 7), setting the control vector logic at 9 to select the right time slot for the switch control to actuate the appropriate flip flop for the desired switch connection of units to configure the processor by the matrix 5. Further details of the well-known vector bit logic selection of time slots for the switch control of such switch fabrics may be obtained, for example, from my earlier U.S. Pat. Nos. 6,999,464; 6,684,317; 7,039,851 and references cited therein.

Figure 6:
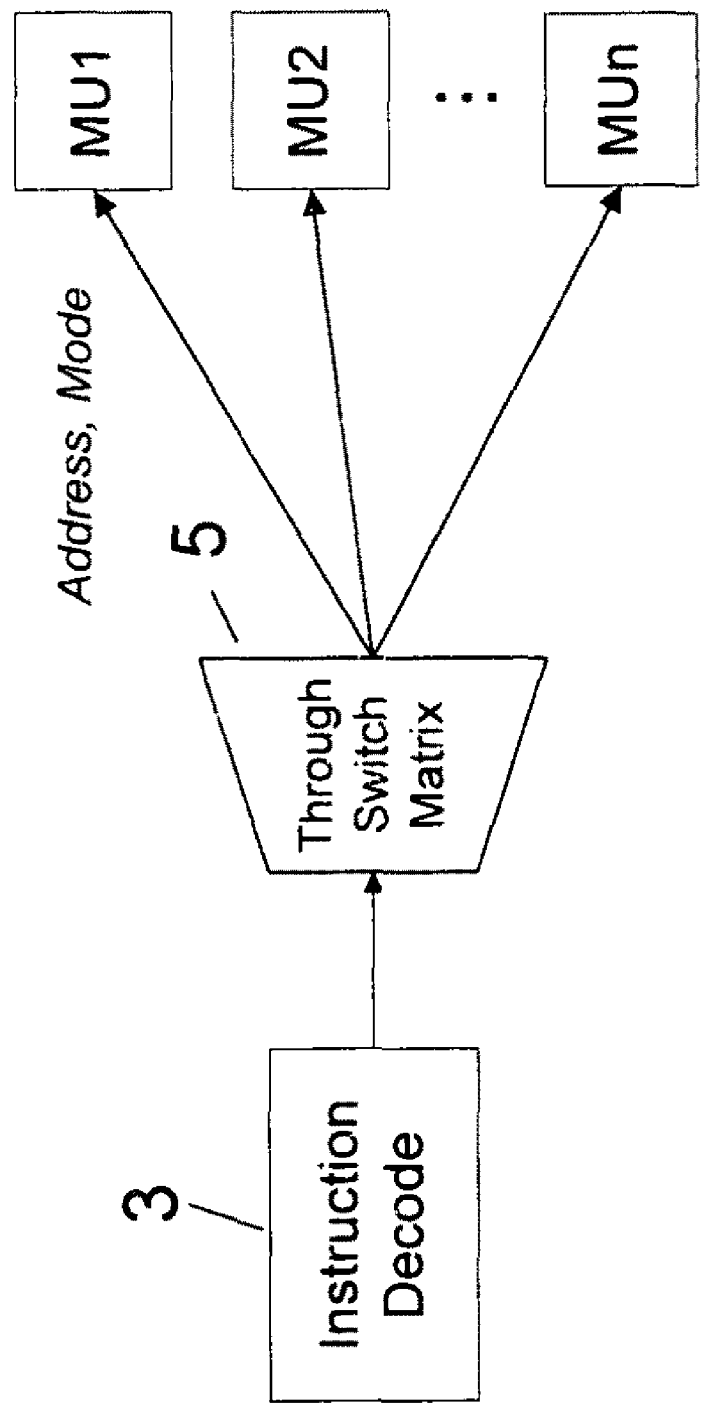
FIG. 6 is a diagram of the configuration of multiple memory units of FIG. 4 with one instruction.

If desired, the instruction decode 3 may configure multiple processor memory units with one instruction, as shown in FIG. 6. The memory unit configuration instruction sets the following parameters for a given memory unit: the start address for memory access; an auto memory address increment after each access (+1+2, +4, etc.); and the memory access frequency such as every 1, 2, 3, . . . clock cycles.

An example of the flexible reconfigurable pipeline and parallel processing capability of the invention with multiplier units MULT1 and 2 and units ALU1 and 2, (Arithmetic Logic Unit), and memory units MU1-4, is presented in FIG. 8 for the case of parallel processing of three assembly instructions, with the vector product, move and vector sum details listed there below. The configured connections amongst units MULT1 and MU1, MU2 and ALU1 are shown in dash lines, while the connection from ALU1 to MU1 is shown as a solid arrow. The configured connection of MU3 to ALU2 is indicated by a dotted line, and that between MU4 and DMA, by a dash-dot line.

FIG. 9 is a matrix diagram inter-relating the configuration assembly instructions for the switch matrix 5. The core compiler 6 of FIG. 5 examines the resource requirements of the specific application, the switch matrix requirement to do the desired configuration of the processor hardware units and the propagation delay of each instruction. It translates these assembly instructions to three types of machine instructions (OP, SC, MU). It combines and re-orders the machine instructions if appropriate to best utilize all the processor hardware units. Lastly, it determines the timing of the machine instruction release into the pipeline PS.

Further architectural advantages that the invention provides over the prior signal processing techniques also include the minimizing of memory and register access through storing intermediate data in an ALU, relieving the burden of interconnect buses, removing the bottleneck of parallel instruction execution by making true parallel processing possible, and allowing processor hardware resources to be more fully and efficiently utilized. For most signal processing algorithms, moreover, it reduces the total necessary cycles and is able to handle the same application at lower clock rates than current signal processing architectures. The invention lowers power consumption, requires fewer pipeline stages, less logic complexity and smaller die sizes.

Consider, for example, the case of the Discrete Cosine Transform Calculations commonly used in video compression. With a general-purpose five stage pipeline processor to calculate this equation, it takes 22 cycles. For a DSP using multiplier accumulation, it takes 10 clock cycles. The architecture of the present invention using one execution unit takes 6 clock cycles; 3 cycles with two execution units plus 1 more cycle for latency; 2 cycles with three execution units plus 2 cycles for latency; 1 cycle with 4 cycles of latency when the number of execution units is increased to 5.

As another example, a typical pipeline in a RISC system requires three instructions. If the equation needs to be executed for N times, the total cycles required by a typical RISC system, is 3*N, whereas, with the approach of the invention, it only requires N+1 cycles, saving a huge number of total cycles.

In summary, the invention provides a novel software solution that is capable of supporting multiple protocols and multiple functionalities in a single device. Configurable hardware structure makes it suitable for many applications. Multiple execution units and memory blocks are configured to make the equation under processing a configurable pipeline, which minimizes the before-mentioned memory register access rate and releases the burden of interconnecting buses. Multiple memory banks increase memory access bandwidth which enables true parallel processing and significantly reduces the total cycles required. More efficient utilization of hardware allows lower clock rate and results in lower power consumption. The lower clock rate also leads to less pipeline stages, thus reducing both die size and logical complexity.

Today's computers are built with a piece of fixed hardware (processor). What the invention suggests is a piece of dynamically configurable hardware, which is not only more efficient in utilizing hardware resources but also capable of handling multiple threads of applications in parallel.

This architecture, as earlier mentioned, relieves part of the burden on the internal buses of prior art signal processors by reducing the frequency of data access. In addition, since memory is divided into several banks and connected to the switch, it increases memory access bandwidth under certain conditions, making full utilization of multiple mathematical units possible. These features allow the device to be configured for performing true parallel processing, thus fully utilizing the calculation capability of the internal functional blocks.

Overall the new processor architecture using the switch technology to connect functional blocks inside a processor instead of putting them into fixed pipeline stages, is dynamically configurable because its internal structure can vary with time. It is readily scalable, as before stated, because the number of functional blocks is only determined by the target application. It is also programmable because it is a true processor and can be applied to many different applications.

Figure 10:
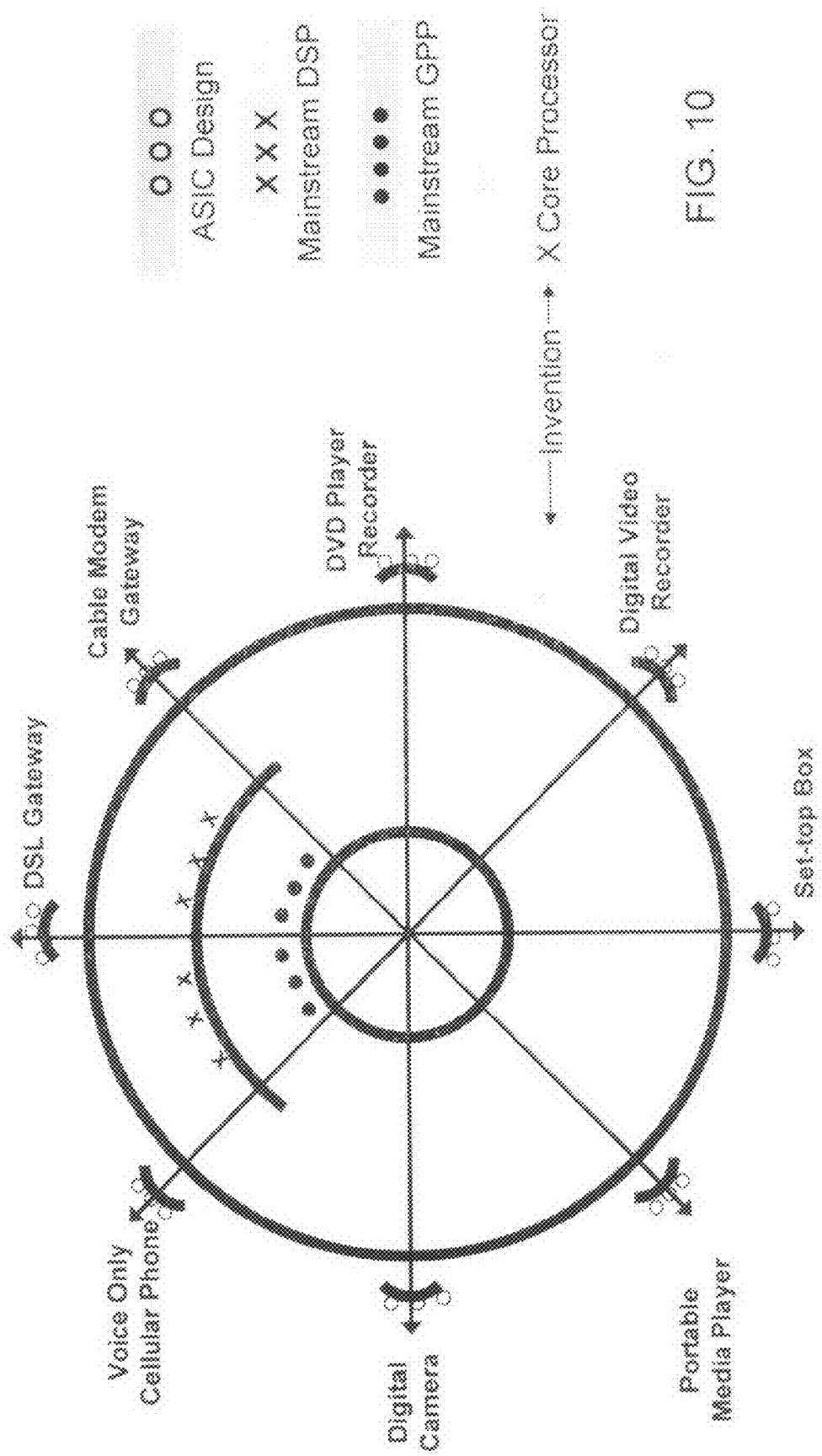
FIG. 10 is a diagram of the universal signal processing application—handling flexibility of the invention.

Lastly, in order pictorially to demonstrate the universality of the present invention in its flexible adaptation of signal processing, and its achievement in overcoming prior art limitations, achieving, rather, unprecedented cost and power savings, reference is made to FIG. 10 showing the software-handling arcs of adaptability for ASIC design (circles), mainstream DSP (crosses), mainstream GPP (dots), and the total circle of adaptability of the invention in the solid line outer circle.

Further modifications will also occur to those skilled in the art, and such are considered to fall within the spirit and scope of the invention as defined in the appended claims.

What is claimed is:

1. A flexible data pipeline architecture for accommodating substantially all types of software computational requirements for varying applications, comprising:
   a programmable embedded processor having a plurality of pipeline stages;
   the pipeline stages including execution units and memory units;
   an interconnecting switch, each of the pipeline stages having a direct connection to the interconnecting switch, the interconnecting switch being able to form direct interconnections between the pipeline stages, the direct interconnections between the pipeline stages being variable in response to varying application instruction sequences so as to interconnect the pipeline stages in any desired number and in any desired order; and
   interconnections between the pipeline stages being reconfigurable and operating modes of at least some of the pipeline stages being changeable under control of each individual instruction as it is executed.

2. The data pipeline architecture of claim 1 wherein the interconnecting switch is a switch matrix.

3. The data pipeline architecture of claim 2 wherein the processor is (1) dynamically configurable because its internal structure can vary with time, (2) scalable because the number of pipeline stages is only determined by the specific application, and (3) is programmable because it is a true processor applicable to many different applications.

4. The data pipeline architecture of claim 1 wherein the pipeline stages can be reconfigured by the individual instructions every clock cycle as the individual instructions are executed.

5. The data pipeline architecture of claim 4 wherein the application instruction sequences are generated by a software compiler receiving application software instructions and analyzing the same to determine which computational tasks need to be performed in each application and how to configure the processor and the connections amongst the pipeline stages to accommodate the same.

6. The data pipeline architecture of claim 5 wherein, after the application instruction sequences are generated, the number of interconnected pipeline stages and the order of the stages vary from time to time and from application to application.

7. The data pipeline architecture of claim 6 wherein the interconnection of the pipeline stages permits of a flexible structure as contrasted with fixed single pipeline data streams.

8. The data pipeline architecture of claim 5 where both simple and complicated software application instruction sequences of varying sizes are enabled efficiently to use the same pipeline concurrently.

9. The data pipeline architecture of claim 1, wherein the interconnecting switch is a cross-connect switch matrix and the pipeline stages include mathematical execution units of adders and multipliers, and memory units dynamically and parallelly interconnectable through the switch.

10. The data pipeline architecture of claim 9 wherein the architecture is scalable, with computation intensive applications requiring more mathematical execution units then less complicated applications.

11. The data pipeline architecture of claim 10 wherein the amount of execution and/or memory units is determined during a design cycle for a particular application without requiring modification to the compiler and with little impact on development time.

12. The data pipeline architecture of claim 9 wherein the memory units are divided into several banks, connected to the switch, thereby increasing memory access bandwidth and making full utilization of multiple mathematical units possible.

13. The data pipeline architecture of claim 1, wherein the processor is configured for performing parallel processing.

14. The data pipeline architecture of claim 1 wherein efficiency resulting from reconfiguring the interconnections between the pipeline stages enables reduction in the total clock rate cycles required for each application.

15. The data pipeline architecture of claim 14 wherein the lower clock rate reduces power consumption and allows for more logic between two pipeline stages, leading to fewer pipeline stages.

16. The data pipeline architecture of claim 14 wherein the lower clock rate provides for more computing power, allowing the handling of more complicated calculations and applications.

17. A flexible data pipeline structure for accommodating software computational instructions for varying program applications, comprising:
a programmable embedded processor having a plurality of pipeline stages, the pipeline stages including mathematical execution units and memory units;
a switch matrix, each of the pipeline stages having a direct connection to the switch matrix, the switch matrix being able to form direct interconnections between the pipeline stages, the direct interconnections between the pipeline stages being variable in response to varying program application instructions, the processor including program memory for storing application instructions from a compiler; and
at least one instruction fetch and decode unit connected to the program memory;
the switch matrix selectively interconnecting pluralities of the mathematical execution units and memory units so as to directly interconnect the pipeline stages in any desired number and in any desired order, the switch matrix being controllable by at least one switch control unit having local storage of at least one switch control vector, the switch matrix being also controllable by commands received from the at least one instruction fetch and decode unit;
the switch matrix providing full access switching with any allowable connections between any two pipeline stages, and with the switch matrix connecting to a DMA; and
the interconnections between the pipeline stages being reconfigurable and operating modes of at least some of the pipeline stages being changeable under control of each individual instruction as it is executed.

18. The data pipeline structure of claim 17 wherein the mathematical execution units are selected from the group consisting of integer multipliers, integer ALU, floating-point multipliers, and floating-point ALU.

19. The data pipeline structure of claim 17 wherein the memory units are one of data memory banks and L2 memory banks.

20. The data pipeline structure of claim 17 wherein the processor is provided with a C library including special computational functions, to be directly fed to the compiler and converting the program to the desired processor machine code instructions for setting the mathematical execution units operation, the switch control instructions for connecting the different execution units, and instructions for setting the parameter of the memory unit operations.

21. The data pipeline structure of claim 20 wherein the compiler exploits parallelism for each program based on its instruction sequence and task-required execution units, producing machine instructions in the appropriate time sequence to configure the execution units and memory units and DMA and the connections amongst them.

22. The data pipeline structure of claim 20 wherein special memory unit configuration instructions are provided for each memory unit providing the start address for memory access, auto memory address increment after each access, and memory access clock cycle frequency.

23. The data pipeline structure of claim 22 wherein one instruction fed through the switch matrix configures multiple memory units, providing address and mode information.

24. The data pipeline structure of claim 17 wherein the switch control unit is operated by switch control vectors to set the connections from the output of one mathematic execution unit to the input of another, the connections from any memory unit to an execution unit input, the connection of the DMA to any memory unit, and the connections from the instruction decoder to any execution unit, memory unit and/or DMA.

25. The data pipeline structure of claim 1 provided in a single package adapted to accommodate the convergence of a variety of differing signal-processing application demands with parallelism.

26. A method of processing computer software computational instructions fed to a processor, the method comprising:
compiling and analyzing inputted user software applications to determine the specific computational tasks that need to be performed for each software application;
generating a set of instruction sequences for each software application, including a set of configuration sequences of the processor functional components and of the connections among them required for that specific software application; and
under control of the individual instructions as they are executed, forming direct interconnections between functional components of the processor through switching of an interconnecting switch, each of the pipeline stages having a direct connection to the interconnecting switch, the interconnecting switch being able to form direct interconnections between the pipeline stages, thereby forming a logical data pipeline having any desired number and order of functional components, interconnections between the functional components being reconfigurable and operating modes of at least some of the functional components being changeable under control of each individual instruction as it is executed.

27. The method of claim 26 wherein said functional components include pluralities of mathematical execution units and pluralities of memory units or banks.

28. The method of claim 27 wherein said switching is cross-connection switching between the execution units and the memory units to configure them into different structures for different application algorithms at different times and corresponding to the different specific software applications.

29. A method as claimed in claim 26 wherein new user defined assembly instructions are created that are tailored to one or more of specific functions, computational equations, or tasks, and which correspond to specific sets of internal processor configurations, including the execution of unit configurations, switch control configurations, and memory unit configurations.

30. A method of signal processing combining microprocessor technology with switch fabric telecommunication technology, the method comprising:

utilizing a programmable processor architecture, configuring connections among functional blocks by software through a switch fabric in a dynamic, parallel and flexible fashion, each of the functional blocks having a direct connection to the switch fabric, the switch fabric being able to form direct interconnections between the functional blocks, thereby forming a reconfigurable logical pipeline having any desired number of directly connected functional blocks in any desired order; and varying the interconnections between the functional blocks, the operating modes of at least some of the functional blocks, and the shape of the logical pipeline from clock cycle to clock cycle and from application to application.

\* \* \* \* \*